G. E. BISHOP.
FASTENER.
APPLICATION FILED FEB. 19, 1918.

1,330,426.

Patented Feb. 10, 1920.
2 SHEETS—SHEET 1.

Inventor
GEORGE E. BISHOP
by
Merkel and Saywell
his attorneys

G. E. BISHOP.
FASTENER.
APPLICATION FILED FEB. 19, 1918.
1,330,426.
Patented Feb. 10, 1920.
2 SHEETS—SHEET 2.
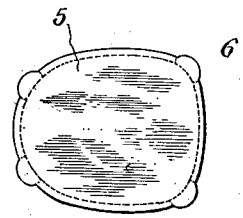
Fig. 7.
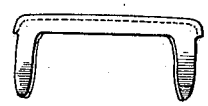
Fig. 8.
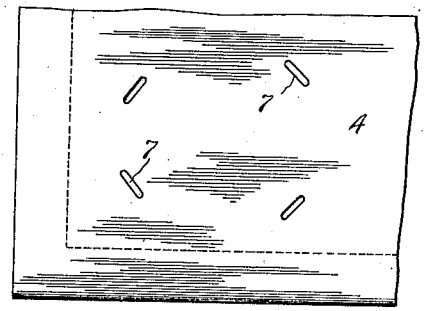
Fig. 6.
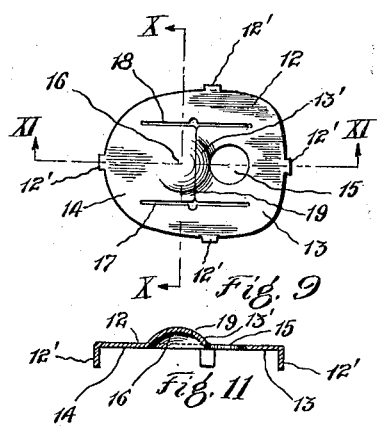
Fig. 9.
Fig. 10.
Fig. 11.
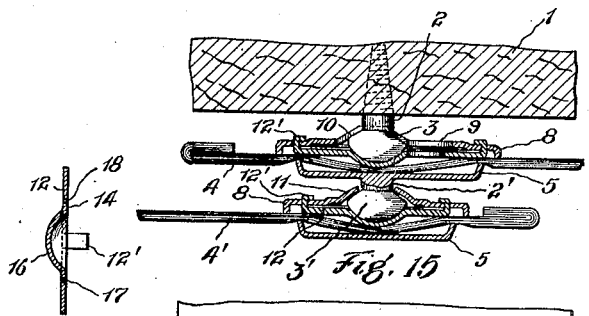
Fig. 15.
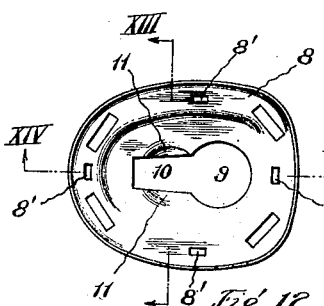
Fig. 12.
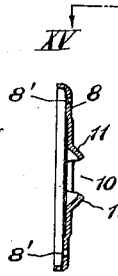
Fig. 13.
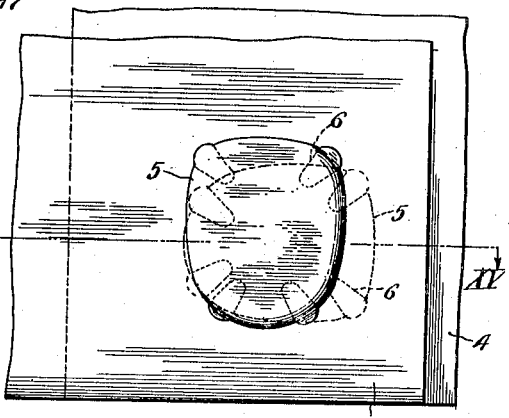
Fig. 16.
Fig. 14.
Inventor
GEORGE E. BISHOP
by Merkel and Saywell
his attorneys

UNITED STATES PATENT OFFICE.

GEORGE E. BISHOP, OF CLEVELAND, OHIO.

FASTENER.

1,330,426.   Specification of Letters Patent.   Patented Feb. 10, 1920.

Application filed February 19, 1918. Serial No. 218,069.

*To all whom it may concern:*

Be it known that I, GEORGE E. BISHOP, a citizen of the United States, resident of Cleveland, county of Cuyahoga, and State of Ohio, have invented new and useful Improvements in Fasteners, of which the following is a specification, the principle of the invention being herein explained and the best mode in which I have contemplated applying that principle, so as to distinguish it from other inventions.

My invention relates to fasteners and particularly to a new and improved construction of the socket members thereof. More particularly, my invention relates to a new and improved fastener particularly designed for automobile use but which is readily adaptable for use as a glove or other fastener. Said fastener is designed to be comprised of only a few parts; to be economically manufactured; to be locked and unlocked by the exertion of direct pressure thereon in the proper direction and not by necessarily tilting or working the same at an angle; to be securely held without any danger of shaking loose; and to be an efficient anti-rattler, although allowing by a ball-and-socket joint desirable relative movements of the stud and socket. Particularly referring to the construction thereof, said improved fastener is provided with finding means whereby the stud portion can be readily inserted within the socket portion; also, with means designed to keep the fastener locked by means of pressure exerted longitudinally of the fastener and stud axes instead of transversely thereof as is now the common practice.

The annexed drawings and the following description set forth in detail certain means embodying my invention, the disclosed means, however, constituting but one of various mechanical forms in which the principle of the invention may be applied.

Figure 1:
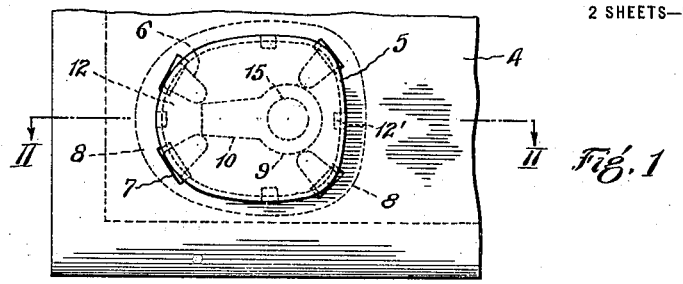
Figure 2:
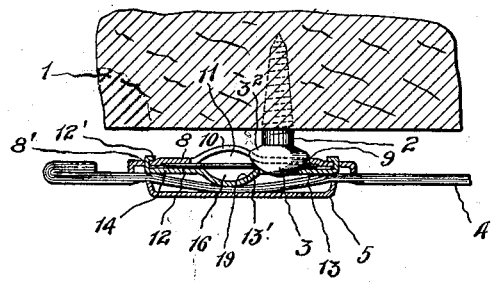
Figure 3:
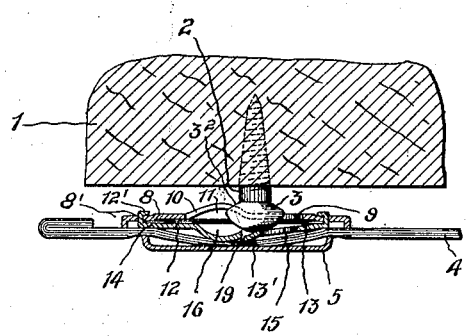
Figure 4:
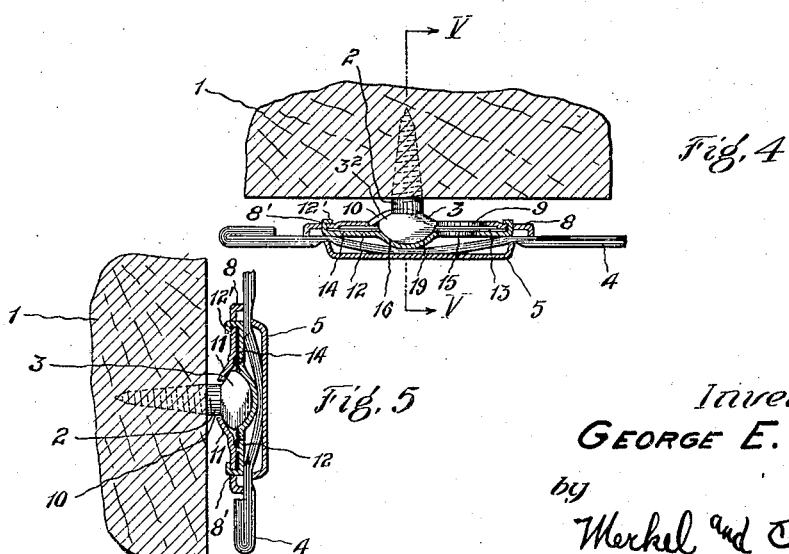
Figure 5:
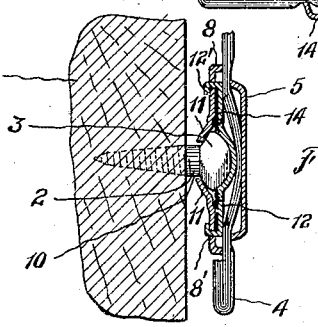

In said annexed drawings:

Figure 1 represents, upon an enlarged scale, a front elevation of my improved fastener in locked position; Figs. 2, 3 and 4 represent central horizontal sections, taken in the plane indicated by the line II—II, Fig. 1, and showing, respectively, the entering, approximately midway, and locked positions of the stud portion; Fig. 5 represents a vertical central section taken in the plane indicated by the line V—V, Fig. 4; Fig. 6 represents a front elevation of a fragmentary portion of automobile curtain fabric to which the socket member of my improved fastener is adapted to be secured; Figs. 7 and 8 represent, respectively, a rear elevation and bottom plan of a gromet; Fig. 9 represents a rear elevation of a retaining spring plate formed with a seat serving as the socket of a ball-and-socket joint; Figs. 10 and 11 represent, respectively, vertical and horizontal sections, taken in the planes indicated by the lines X—X and XI—XI, respectively, Fig. 9; Fig. 12 represents a rear elevation of the socket member proper; Figs. 13 and 14 represent, respectively, vertical and horizontal sections, taken in the planes indicated by the lines XIII—XIII and XIV—XIV, respectively, Fig. 12; Fig. 15 represents a central horizontal section of a double fastener, taken in the plane indicated by the line XV—XV, Fig. 16; and Fig. 16 represents a front elevation of the fastener shown in Fig. 15.

Referring to the accompanying drawings, there is indicated therein by the ordinal 1 a fragmentary portion of an automobile standard to which is secured any standard form of screw provided with a shank 2 and head 3, the same serving as the stud member of my new and improved fastener. To the automobile curtain fabric 4 is secured the socket member of my new and improved fastener which is designed to receive the stud and to be disposed over the head member 3 thereof. By the construction of this socket member, the detail of which will now be given, it is not necessary to provide apertures in the fabric 4 other than a plurality of small apertures 7 through which the prongs 6 of a gromet 5 are inserted for securing the socket member and a spring member (hereinafter described) to the fabric. The socket member comprises a plate 8 formed, as plainly indicated in Figs. 12, 13 and 14, with communicating openings 9 and 10, of the general design plainly shown in said Fig. 12 and forming, respectively, head-receiving and shank-receiving openings for the stud. The upper and lower walls of the groove 10 are rounded and rearwardly extended to form the inner concaved portions 11, for the purpose hereinafter fully described. Disposed intermediately of the socket portion 8 and fabric 4 is a spring plate 12, plainly shown in Figs. 9, 10 and 11, and formed with longitudinal cuts 17 and 18 and a connecting transverse cut 19 creating the spring portions 13 and 14, as plainly shown in said Fig. 9. Said spring portion 13 is formed with a hole 15 and the inner adjacent edges of said spring portions 13 and 14 are bent forwardly to form the concaved members 13' and 16, as plainly shown in said Figs. 9, 10 and 11, the same forming a seat for the purpose hereinafter fully explained.

The socket member 8 and spring member 12 are held rigidly relatively to each other by means of prongs 12' formed upon the plate 12 and adapted to be inserted through the holes 8' of the socket portion 8, and turned down as shown in Fig. 1.

When it is desired to fasten the socket member upon the stud, the head 3 of the latter is inserted within the comparatively large opening 9 as far as will be allowed by the hole 15 of the spring plate portion 13, said hole 15 and opening 9 being so relatively disposed as to allow this action, as plainly shown in Figs. 2, 3 and 4. If desired, an aperture in the gromet 5 may be provided to allow for any necessary outward pressure upon the fabric 4. The above-mentioned relation, in combination with concaved portions 11, provides a finder whereby the surface $3^2$ of the head 3 commences to be engaged by the walls 11 of the opening 10 so that proper pressure upon the concaved spring edge portion 13' will bring the stud head 3 into position whereby the shank of the stud 2 will enter the groove 10, the stud head 3 then being disposed in the position shown in Fig. 3. The stud head can then be slipped well in front of the said wall members 11 into the position shown in Fig. 4 wherein said concaved members 13' and 16 form a perfect seat for the whole stud head 3, said members 13' and 16 exerting sufficient pressure outwardly from the fabric 4 to hold the stud head surface $3^2$ securely against the concave surfaces of the wall members 11. Any desirable automatic adaptability between the stud and socket, induced by the flapping of the fabric 4, etc., is provided for, inasmuch as the head 3 and the seat, comprising the members 13' and 16, form a ball-and-socket joint and yet preserve the anti-rattling and securely-fastened qualities of the fastener.

In Figs. 15 and 16, I have illustrated a double fastener in which the front of the gromet 5 is formed with the shank 2' and the head 3' of a second stud adapted to coöperate with a second socket member secured to a fabric 4' and of a construction identical with that of the socket secured to fabric 4.

As a matter of practice, I have found it convenient to so relatively dispose the stud and the socket member that a slight stretching of the fabric 4 is necessary to bring the hole 15 and opening 9 immediately in front of the stud 2, in order that, when the head 3 has been brought to the position shown in Fig. 2, the natural contraction of the fabric 4 will assist in carrying the socket member into that position, relatively to the stud, which is shown in Fig. 4.

The construction of my improved fastener, as hereinbefore fully detailed, accomplishes the results for which it was designed, as mentioned in detail in the first part of this specification.

What I claim is:

1. In a fastener, the combination with suitable fabric and a stud; of a socket member, means for securing said member to the fabric, and two relatively movable spring members disposed intermediately of said socket member and the fabric and forming a seat for said stud.

2. In a fastener, the combination with suitable fabric; of a socket member provided with communicating large and comparatively small openings, respectively, means for securing said member to the fabric, and two relatively movable large and comparatively small spring members respectively, disposed intermediately of said socket member and the fabric, said comparatively small spring member being disposed adjacently to said large socket opening.

3. In a fastener, the combination with suitable fabric and a stud; of a socket member, means for securing said member to the fabric, a member disposed intermediately of said socket member and the fabric and formed with a seat, means disposed adjacently to said seat and adapted to form a finder thereto for said stud, and means for separably holding the latter in said seat.

4. In a fastener, the combination with suitable fabric and a stud; of a socket member, means for securing said member to the fabric, a member disposed intermediately of said socket member and the fabric, said member being formed with a seat, an aperture in said last-named member, means disposed adjacently to said aperture and adapted to coöperate therewith to form a finder to said seat for the stud, and means for separably holding the latter in said seat.

5. In a fastener, the combination with suitable fabric; of a socket member formed with communicating openings of different diameters, means for securing said member to the fabric, and two relatively movable spring members disposed intermediately of said socket member openings, respectively, and said fabric, said spring members being formed with a seat.

6. In a fastener, the combination with suitable fabric; of a socket member formed with communicating openings of different diameters, means for securing said member to the fabric, and two relatively movable spring members disposed intermediately of said socket member openings, respectively, and said fabric, one of said spring members being formed with a seat, and the other of said spring members being formed with an aperture.

7. In a fastener, the combination with a stud comprising suitable head and shank members; of a socket member formed with communicating openings of different diameters, means for securing said last-mentioned member to the fabric, that part of the body of the socket member forming the wall of the smaller opening being formed to accommodate the head member of the stud, means provided with a seat and adapted to exert pressure upon said head member for holding the latter in the socket member; and means adapted, in combination with the formed wall of said opening, to form a finder, thus providing for the ready entrance of the stud-shank to the opening and the seating of the stud-head.

8. In a fastener, the combination with a stud comprising suitable head and shank members; of a socket member adapted to receive said stud, and means adapted to exert pressure upon the head member of said stud and formed with a seat for said head, said head and seat forming a ball-and-socket joint, the construction being such that said stud and socket are held securely fastened and yet are automatically relatively adjustable.

Signed by me, this 15th day of February, 1918.

GEORGE E. BISHOP.